United States Patent [19]

Janner et al.

[11] 4,286,153
[45] Aug. 25, 1981

[54] METHOD AND APPARATUS FOR THE SEPARATION OF ISOTOPE MIXTURES

[75] Inventors: Karl Janner, Erlangen; Klaus Gregorius, Neunkirchen; Eberhard Schuster, Erlangen, all of Fed. Rep. of Germany

[73] Assignee: Kraftwerk Union Aktiengesellschaft, Mulheim, Fed. Rep. of Germany

[21] Appl. No.: 703,784

[22] Filed: Jul. 9, 1976

[30] Foreign Application Priority Data

Aug. 19, 1975 [DE] Fed. Rep. of Germany ....... 2536940

[51] Int. Cl.$^3$ ............................................. B01D 59/00
[52] U.S. Cl. ...................................... 250/281; 55/17; 55/267; 204/157.1 R; 204/DIG. 11; 250/423 P; 250/489; 423/19
[58] Field of Search ........................... 55/17, 101, 267; 250/423 P, 527, 281, 489; 204/157.1 R, DIG. 11; 423/19

[56] References Cited

U.S. PATENT DOCUMENTS

| | | | |
|---|---|---|---|
| 3,558,877 | 1/1971 | Pressman | 250/41.9 |
| 3,616,596 | 11/1971 | Campargue | 55/17 |
| 3,626,665 | 12/1971 | Fenn et al. | 55/17 |
| 4,025,787 | 5/1977 | Janner et al. | 250/251 |
| 4,025,790 | 5/1977 | Jetter et al. | 55/101 X |
| 4,032,306 | 6/1977 | Lee | 204/DIG. 11 |
| 4,082,633 | 4/1978 | Eerkens | 204/157.1 R |

OTHER PUBLICATIONS

Metz, William D., "Laser Enrichment: Time Clarifies the Difficulty," Science vol. 191, Mar. 19, 1976, pp. 1162-1163, 1193.
Eerkens, J. W., "Spectral Considerations in the Laser Isotope Separation of Uranium Hexapluoride," Appl. Phys. 10: pp. 15-31, May, 1976.
Eerkens, J. W., "Reaction Chemistry of the UF$_6$ LISO-SEP Process," Optics Communications, 18(1): 32-33, Jul. 1976.
Jetter, H. et al., Uranium Isotope Separation using IR-Lasers, Proceedings of the International Conference on Laser Isotope Separation, 3/5-7/1975, Organised by the British Nuclear Engineering Society.
Hecht, J. Analog, vol. 46, No. 9, Sep. 1976, pp. 53-68.
Hodgson et al., IBM Technical Disclosure Bulletin vol. 17 (11), Apr. 1975, pp. 3501-3502.
Robinson, C. P., Laser Isotope Separation, Paper presented at the N.Y. Academy of Sciences Third Conference on the Laser.
Robinson, C. P. et al., Some Developments in Laser Isotope Separation at Los Alamos, Paper presented at Am. Physical Soc. Meeting 2/2-5/76.

*Primary Examiner*—Richard E. Schafer
*Attorney, Agent, or Firm*—Herbert L. Lerner

[57] ABSTRACT

Method and apparatus for separation of an isotope substance from a mixture of isotope substances such as UF$_6$ by adiabatically decompressing the mixture in vaporous or gaseous form to cool the mixture to a temperature below 100° K. and irradiating by an electromagnetic wave selectively absorbed by an isotope substance, passing the mixture after cooling and irradiating in a diffuser at a velocity greater than the speed of sound and decelerating to convert the velocity into pressure with reduced velocity of the mixture. The higher pressure results in substantial reduction in operating costs and capital investment.

6 Claims, 5 Drawing Figures

METHOD AND APPARATUS FOR THE SEPARATION OF ISOTOPE MIXTURES

CROSS-REFERENCE TO RELATED APPLICATION

The following application, assigned to Kraftwerk Union Aktiengesellschaft, the assignee of the present application, is hereby incorporated by reference: Application Ser. No. 614,213, filed for Klaus Gregorius and Karl Janner on Sept. 9, 1975.

BACKGROUND OF THE INVENTION

1. Field of the Invention

This invention relates to the separation of a substance from a mixture of substances and more particularly refers to a new and improved method and apparatus for the separation of an isotope substance from a mixture of isotope substances subjected to irradiation by an electromagnetic wave.

2. Description of the Prior Art

The separation of mixtures of substances, particularly of isotopes or isotope compounds, using the principle of selective excitation, dissociation or ionization of the one substance, preferably under conditions to chemically react with a separately supplied other reaction partner is described in U.S. patent application Ser. No. 614,213. In the process of the latter application, the initially vaporous substances are decompressed adiabatically to temperatures below 100° K. and then before condensation occurs are irradiated by an electromagnetic wave, preferably by a laser beam of appropriate frequency confined in a resonator. The expansion usually takes place in a vacuum chamber which is connected to appropriate vacuum pumps and/or is equipped with condensation devices. The pressure reduction required with this method is about 4 to 5 orders of magnitude, for example, for an adiabate coefficient K=1.33 corresponding to $UF_6$ with supplemental gas, necessitating considerable pumping and cooling capacity to maintain the high vacuum.

In the case of installations of considerable capacity, this means large expenditures in capital investment, and also substantially affects the economy of the method because of the high operating costs.

SUMMARY OF THE INVENTION

An object of the present invention is to provide a method and apparatus for isotope separation employing irradiation in which pumping and cooling are materially reduced.

With the foregoing and other objects in view, there is provided in accordance with the invention a method for the separation of an isotope substance from a vaporous mixture of isotope substances involving selective excitation, dissociation or ionization of one substance by adiabatically decompressing the vaporous mixture to cool it to a temperature below 100° K. and irradiating the cooled vaporous mixture by an electromagnetic wave selectively absorbed by an isotope substance, including passing the vaporous mixture, after cooling and irradiation, at a velocity greater than the speed of sound and decelerating to convert the velocity into pressure with reduced velocity of the vaporous mixture, and cooling and condensing at least part of the vaporous mixture or reduced velocity.

In accordance with another feature of the invention, there is provided apparatus for the separation of an isotope substance from a vaporous mixture of isotope substances involving selective excitation, dissociation or ionization of one substance by adiabatically decompressing the vaporous mixture to cool it to a temperature below 100° K. and irradiating the cooled vaporous mixture by an electromagnetic wave selectively absorbed by an isotope substance, including a supersonic diffuser in which the vaporous mixture, after cooling and irradiation, flows at a velocity greater than the speed of sound and in which shock wave occurr and there is a transition from supersonic to reduced velocity flow, cooling members disposed in the path of flow of the substances, partition members to separate the flow of substances which have been subjected to irradiation from substances which have not been subjected to irradiation and outlet means for separately discharging the two separated flows.

BRIEF DESCRIPTION OF THE DRAWINGS

Other features which are considered as characteristic for the invention are set forth in the appended claims.

Although the invention is illustrated and described herein as embodied in method and apparatus for the separation of isotope mixtures, it is nevertheless not intended to be limited to the details shown, since various modifications may be made therein without departing from the spirit of the invention and within the scope and range of equivalents of the claims.

Figure 1:
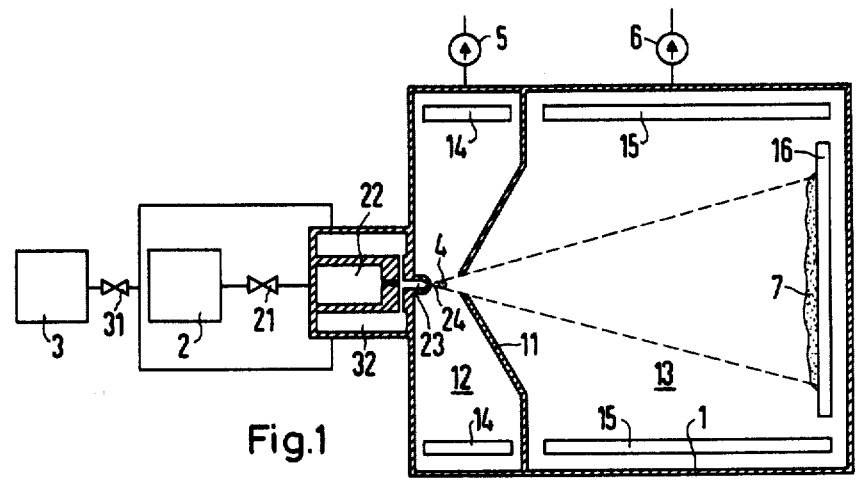
Figures 2, 3:
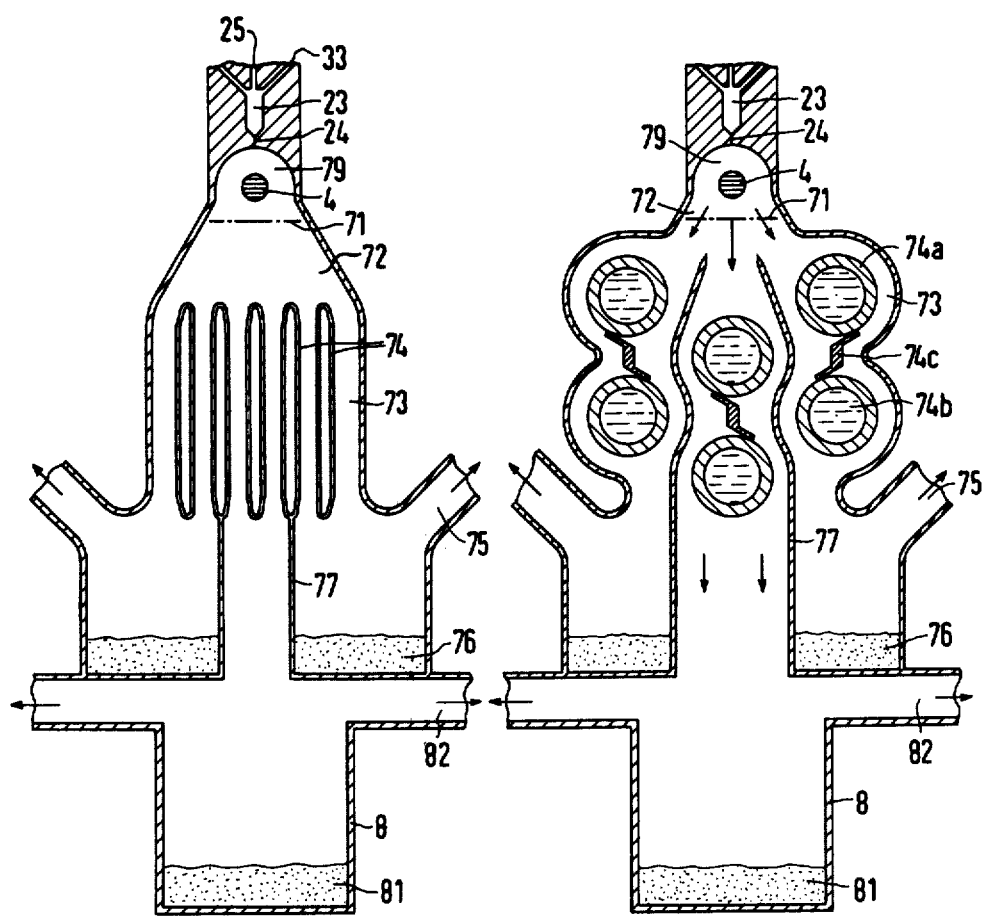
Figure 4:
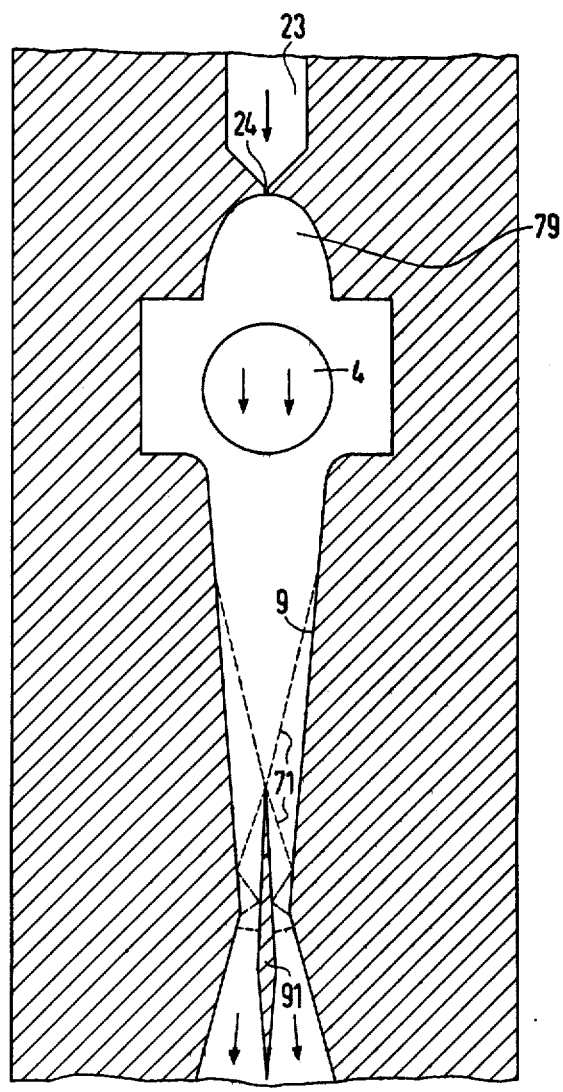

The construction and method of operation of the invention, however, together with additional objects and advantages thereof will be best understood from the following description when read in connection with the accompanying drawings, in which:

FIG. 1 shows the apparatus of U.S. patent application Ser. No. 614,213;

FIG. 2 diagrammatically illustrates apparatus for carrying out the method of the present invention;

FIG. 3 illustrates another embodiment of the apparatus for practicing the invention;

FIG. 4 shows a further modification of the apparatus; and

Figure 5:
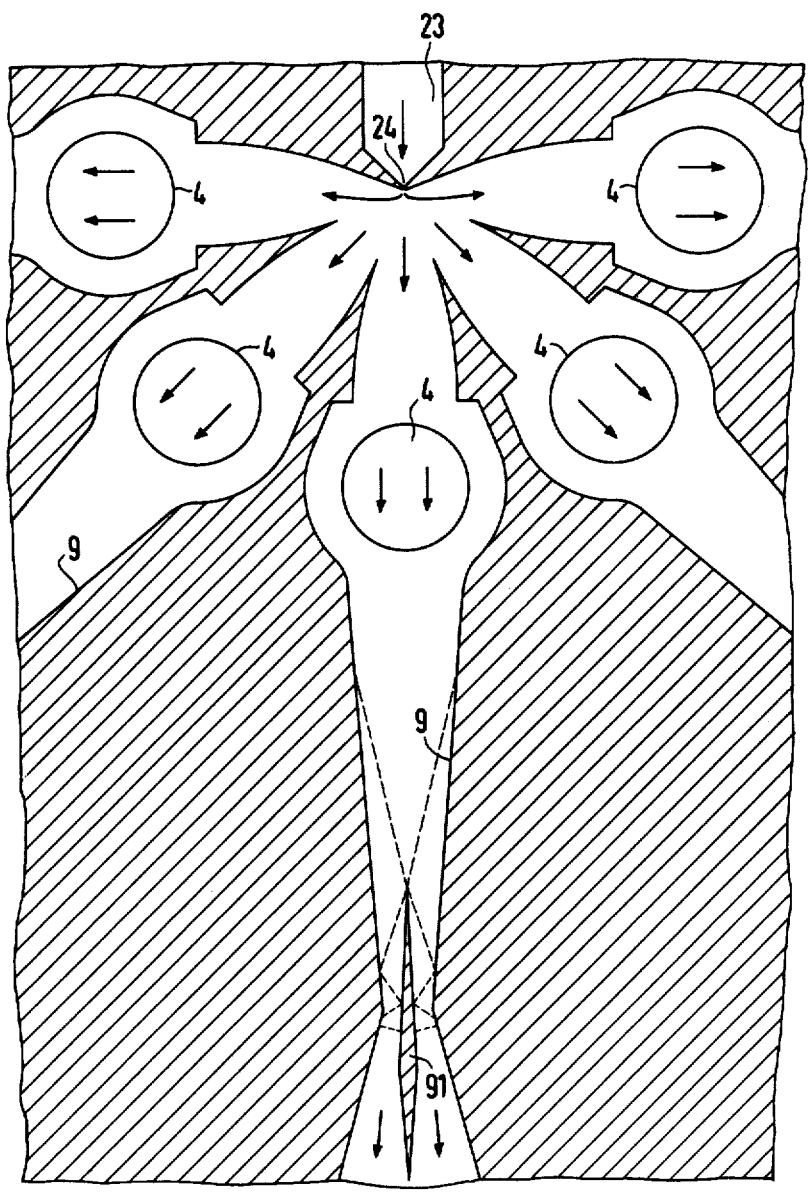

FIG. 5 shows apparatus having a plurality of flow canals radially connected.

DETAILED DESCRIPTION OF THE INVENTION:

Referring to the drawing, FIG. 1 shows the apparatus provided in accordance with U.S. Patent application Ser. No. 614,213. The operation of the apparatus according to FIG. 1 is described in detail in Patent application Ser. No. 614,213, so that it is not necessary to explain it here again. The separation of the uranium isotopes 235 and 238, starting with uranium hexafluoride, was chosen as an example for the isotope separation by means of this method. In carrying out this method, the vapor of this compound is mixed in the mixing chamber 23 shortly ahead of the expansion nozzle 24 with a reaction partner from the supply tank 3. The mixture is adiabatically decompressed when it passes through the nozzle 24, is deeply cooled thereby and is selectively excited by the laser beam 4. By the selective excitation of the one isotope compound, the latter is enabled to enter into a chemical reaction with the reaction partner or reactant which is fed-in at the same time producing a new compound. Separation of this new compound, which in the ideal case contains only one uranium isotope, from the remaining mixture of substances can be achieved by physical or chemical means.

Embodiments of the apparatus for implementing the method in accordance with the invention as shown in FIGS. 2, 3, 4 and 5 replace those parts for carrying out the method of patent application Ser. No. 614,213, which were provided after the expansion nozzle or the laser beam as shown in FIG. 1.

The apparatus schematically shown in FIG. 2 practically follows that shown in FIG. 1 up to nozzle 24. Ahead of the nozzle 24 there is the mixing chamber 23, into which the $UF_6$ vapor is fed via the line 25. The reaction partner or reactant is introduced into mixing chamber 23 via the line 33. Adjoining the nozzle 24, which will in general have the form of a slit, is the expansion chamber 79, the diffuser 72 and the flow canal 73. The latter parts are likewise of elongated shape. The laser beam 4 shown in the drawing as after the nozzle 24, is shown schematically. The adiabatically decompressed mixture of substances passing through laser beam 4 gets to the cross pieces 74 which are arranged in the interior of the flow canal 73 and are kept at an appropriately constant temperature for reducing thermally activated reactions and/or for at least partially condensing components of the mixture of substances. Below the cooling section 74, the flow canal 73 is subdivided by partitions 77 which partitions bound a passageway leading to a plenum 8. Thus, the partitions 77 divide or separate the flow into a stream containing all or most of the components which have been subjected to laser beam 4 and another stream containing little or none of the components subjected to laser beam 4. In this manner, only those components of the reaction mixture reach the plenum 8 which have passed through the laser beam 4. Those portions of the mixture of substances, which by-pass the laser beam laterally and were therefore not excited and in which therefore also no separation of substances takes place, are collected in the lower part of the flow canal 73 in the area 76. The reaction mixture after passing through laser beam 5 generally contains readily condensible or vaporous constituents such as $UF_4$, $UF_5$, $UF_6$ and complexes with reaction partners, which are condensed in whole or part and collect as shown by numerals 76 and 91; and gaseous or non-condensible constituents such as $H_2$, HI, HF, $Cl_2$, $Br_2$, and NO which are not condensed by cooling section 74 and are released through outlets 75 and 72. In the lower part of the plenum 8, the reaction products, e.g., 235 $UF_6$, are precipitated; both can be separated from each other without difficulty, for example, by fractional distillation due to their different vapor pressures. Gaseous components in this chamber are suctioned off via lines 82 by means of pumps, not shown, connected to outlets 75 and 82 for evacuating the spaces in communication therewith.

As previously mentioned, a high vacuum is maintained in vacuum chamber 1 (FIG. 1). To reduce the required pumping and cooling capacity, a substantially lesser vacuum is generated than heretofore, so that a higher pressure prevails in the flow canal 73 than in the expansion chamber 79 (FIG. 2). The pressure is adjusted so that a compression shock occurs within the jet or stream of the mixture of substances when the jet or stream enters the diffuser 72. The supersonic flow of the expanded mixture or stream makes a sudden transition at this point into the subsonic region, while the pressure and the temperature rise at the same time. Thus, a so-called pressure recovery takes place. For further clarification of this phenomenon, it is pointed out that the supersonic velocity is initially about Mach number 9 and is slowed to just barely subsonic velocity in shock-fashion. The pressure in the mixture or stream rises here about 100 times, the temperature about 18 times and the density about 5.7 times, if the adiabatic coefficient of the mixture of substances is 1.4. In the subsonic flow, the pressure is increased further after the compression shock in the expanding diffuser. These data show that the required pump power can be reduced considerably as compared to that in the apparatus according to FIG. 1.

As already mentioned, the gas jet or vapor jet or stream passes through the cooling webs 74, where the easily condensed components such as, for example, $UF_5$ and $UF_6$, can be precipitated. These precipitates can be separated by mechanical means, not shown, or by introducing ultrasonic vibrations, thereby loosening the precipitates from webs 74, and the precipitates then drop into the plenums 76 or 81, respectively. The components, normally non-condensible gases, drawn off via the line 75 can be discharged from the system, optionally be returned to the mixing chamber 23 or first subjected to purification and returned to mixing chamber 23. Standard dust separation techniques, such as electrofilters may be employed to separate entrained condensed mixture constituents in finely divided form from the non-condensible gases discharged through outlets 75 and 82.

FIG. 3 is a variant of the apparatus shown in FIG. 2. The operating principle is the same, except that the cooling webs 74 are replaced by rotating cylinders 74a, through which a coolant 74b flows. The substances condensed on the cylinders are automatically and continuosly wiped off by wipers 74c and fall into the plenums 76 and 81. The partitions 77 can be kept here at a somewhat higher temperature, so that no condensation takes place on them. FIG. 4 shows a further embodiment of the apparatus shown in FIGS. 2 and 3 with regard to effective throughput and pressure and temperature. By the special shape of the nozzle exit, a parallel jet or stream of the reaction partner is first generated in the expansion, which passes almost completely through the effective zones of the laser beam. The depicted widening of the flow canal creates room for the laser beam and prevents a weakening of the same by the wall. The jet or stream of the vapor mixture, which is free in this region, is collected in the narrowing canal 9. This canal then expands again, with the wedge 91 having a surface contoured in the manner indicated disposed at the narrowest point. The shape of the flow canal is chosen so that compression shock waves 71, which form at edges and breaks, except for the lastmentioned oblique ones, are optimized in known manner with respect to the pressure gain with a minimum temperature rise. The last impact leads the flow into the subsonic region. The enlargement of the flow canal that follows then leads to a further pressure increase. The continuation of the flow canal from the break-off section in FIG. 4 is not shown since it corresponds to that shown in FIGS. 2 and 3.

FIG. 5 shows an apparatus composed of several flow canals with each flow canal corresponding generally to the flow canal illustrated in FIG. 4. The five flow canals 9 shown in FIG. 5 are radially connected, and are fitted to receive the flow from the expansion nozzle 24. The nozzle 24 can be made somewhat wider to accommodate greater throughput of the mixture of substances. A wider nozzle is also easier to fabricate. The flow pattern in the individual canals 9 is practically the same here as in FIG. 4. To each flow canal 9 is connected the collecting devices described in FIGS. 2 and 3.

The walls of the flow canals are cooled or kept at appropriately constant temperatures by known means, not shown. The condensation can take place not only directly at the cooling ribs 74 but also at a liquid which flows along them and does not react with the mixture of substances. In the case of treating fluorine compounds, e.g., uranium fluorides, a fluorine compound such as, known refrigerant fluorocarbon compounds, for example, a Freon, is preferably used for this purpose. Separators, which are at a somewhat higher temperature to prevent condensation, may also precede the webs 74 to effect better separation of the partial gas streams which have or have not passed through the laser beam.

The selection of the gas additions, already known from the previous U.S. Patent application Ser. No. 614,213, is made so that the adiabatic coefficient K is as large as possible in the temperature range of interest and the relaxation time for the vibration is so short that a quick approach of the vibration temperature to the translation temperature is achieved. Because of the rapid rotational relaxation and the relatively fast energy transfer in the vicinity of the energy resonance, it is also advantageous to use a supplemental gas in which the difference between the vibration energy of the uranium compound and the rotational energy of the supplemental gas is not large.

Another consideration for the choice of the addition gas is the interception of the radical occurring in the reaction; thus xenon can at the same time serve for intercepting the fluorine radical.

In the previous U.S. Patent application Ser. No. 614,213, the reaction of $UF_6$ with HBr was described in detail. For the sake of completeness, it should be mentioned that other reaction partners can be considered. Some examples for this, including the reactions for separating the uranium isotopes possible therewith will be given.

$$UF_6 + \tfrac{1}{2}H_2 + n.h.\gamma_j \rightarrow UF^*_6 + \tfrac{1}{2}H_2 \rightarrow UF_5 + HF + Q_j$$

The abbreviation n.h.$\gamma$ means n quanta of energy h.$\gamma$, whereby h means the Planck's constant. The $UF_6$ is thus excited selectively and only the selectively excited molecules react with molecular hydrogen $UF_5$ and fluoric acid are formed, which is suctioned off. This reaction occurs normally only at elevated temperatures, albeit, not selectively and can be performed selectively by the method described here and can therefore be used for isotope separation.

Reactions of $UF_6$ with hydrogen halides can also be used for separating isotopes in accordance with the invention, such as, for example $$UF_6 + HI + n.h.\gamma_k \rightarrow UF^*_6 + HI \rightarrow UF_5 + HF + I + Q_k$$

The mixture of $UF_6$ and hydrogen iodide vapor passes through the laser beam, whereby $UF_6$ is selectively excited and reacts selectively with the hydrogen iodide, so that $UF_5$ is formed which contains only the excited uranium isotope. This reaction requires only little activation energy, so that it would proceed unselectively at room temperature and the reaction would proceed too fast under these unselective conditions. It is therefore advisable to mix the reaction partners only after a sufficiently low temperature is reached, at which low temperature an automatic reaction does not occur. Only the selective excitation at this temperature makes the desired selective chemical reaction possible. The low temperature required for the reaction partners to be mixed can be produced, for example, by a partial decompression of the individual partners or is brought about by arranging two parallel expansion nozzles, the vapor jets of which meet in the region of the laser reaction 4 and are mixed there.

Similar redox reactions are possible also with other simple molecules such as $NH_3$, $H_2S$, $SOCl_3$, for example $$UF_6 + SOCl_2 + n.h.\gamma_k \rightarrow UF^*_6 + OSCl_2 \rightarrow UF_5 + SOClF + \tfrac{1}{2}Cl_2$$

Complex forming reactions, especially for $UF_6$, can also be used, such as, for example $$UF_6 + NOF + n.h.\gamma_k \rightarrow UF^*_6 + NOF \rightarrow NO[UF_7]$$

and $$UF_6 + NO + n.h.\gamma_k \rightarrow UF^*_6 + NO \rightarrow NO[UF_6].$$

Organic compounds are also usable as reaction partners:

$$UF_6 + CHCl=CCl_2 + n.h.\gamma_k \rightarrow UF^*_6 + CHCl=CCl_2 \rightarrow UF_5 + \text{fluorohydrocarbons}$$

Further reaction partners which contain halogens other than fluorine can be used for the separation halogen exchange reaction. As the halogen exchange proceeds in stages, it can be expected under the conditions of separation at lower temperatures that intermediate stages can be intercepted in accordance with the following functional relation:

$$UF_6 + BBr_3 + n.h.\gamma_k \rightarrow UF^*_6 + BBr_3 \rightarrow UF_5Br + BBr_2F$$

The vapor pressure differences between $UF_5Br$ and $BBr_2F$ permit fractional condensation in the temperature gradient of the decompressed gas jet. After the temperature is increased, the separated product $UF_5Br$, which is enriched with the one uranium isotope, can further react as follows:

$$2UF_5Br \rightarrow UF_4 + UF_6 + Br_2$$

The reaction products can readily be separated from each other; $UF_4$ is solid, and $UF_6$ and $Br_2$ can be separated by fractional condensation.

The separation of other isotope compounds is also possible with the method as exemplified by the examples. It would also be possible to let a normal nonselective chemical reaction proceed and to selectively excite only the reaction product generated in this process and to make the isotope separation proper feasible thereby.

There are claimed:

1. In apparatus for the separation of an isotope substance from a vaporous mixture of isotope substances involving selective excitation, dissociation or ionization of one substance by adiabatically decompressing the vaporous mixture to cool it to a temperature below 100° K. and irradiating the cooled vaporous mixture by an electromagnetic wave selectively absorbed by an isotope substance, the improvement which comprises a diffuser in which the vaporous mixture, after cooling and irradiation, flows at a velocity greater than the speed of sound and in which shock wave occurs and there is a transition from supersonic to reduced velocity flow, cooling members disposed in the path of flow of the substances, partition members to separate the flow of substances into a flow containing most of the substances which have been subjected to irradiation from substances of which most have not been subjected to irradiation and outlet means for separately discharging said two separated flows.

2. Apparatus according to claim 1, wherein said diffuser has a flow canal which first becomes slightly narrower and then expands again and contains in this transition zone a centrally located flow wedge which is pointed on both sides in the axial direction.

3. Apparatus according to claim 3, wherein said adiabatic decompression is effected by passing the vaporous mixture of isotope substances through an expansion nozzle and following the expansion nozzle, several laser beams, each with associated flow canals and means for separating the flow of substances which have been subjected to irradiation are arranged in radial configuration.

4. Apparatus according to claim 1, wherein said cooling members are rotating cylinders and wherein wipers are disposed adjacent the rotating cylinders to remove condensed substances deposited thereon.

5. Apparatus according to claim 4, wherein said rotating cylinders are hollow and wherein a cooling fluid flows through said hollow cylinders.

6. Apparatus according to claim 1, wherein each said separate flow has disposed beneath it a separate chamber in communication therewith to receive and collect condensed constituents precipitating out of each separate flow, each said chamber having a discharge outlet for the release of non-condensed constituents.

* * * * *